(12) United States Patent
Chen

(10) Patent No.: US 6,229,893 B1
(45) Date of Patent: May 8, 2001

(54) UNIVERSAL HANDS-FREE RECEIVER FOR A MOBILE TELEPHONE

(75) Inventor: Tonny Chen, Chang-Hua (TW)

(73) Assignee: E. Lead Electronic Co., Ltd., Chang-Hua (TW)

( * ) Notice: Subject to any disclaimer, the term of this patent is extended or adjusted under 35 U.S.C. 154(b) by 0 days.

(21) Appl. No.: 09/200,485

(22) Filed: Nov. 27, 1998

(51) Int. Cl.[7] .................................................. H04M 1/00
(52) U.S. Cl. .......................... 379/454; 379/454; 379/455; 379/446
(58) Field of Search .................................... 455/550, 575, 455/90, 347, 351, 569; 379/454, 455, 446, 426; 224/930, 929, 197, 678, 679

(56) References Cited

U.S. PATENT DOCUMENTS

| | | | |
|---|---|---|---|
| 4,241,870 | * 12/1980 | Marcus | 296/37.7 |
| 5,033,709 | * 7/1991 | Yuen | 248/313 |
| 5,142,573 | * 8/1992 | Umezawa | 379/454 |
| 5,388,155 | * 2/1995 | Smith | 379/446 |
| 5,457,745 | * 10/1995 | Wang | 379/454 |
| 5,480,115 | * 1/1996 | Haltof | 248/221.11 |

* cited by examiner

*Primary Examiner*—Vivian Chang
*Assistant Examiner*—John J Lee
(74) *Attorney, Agent, or Firm*—Rosenberg, Klein & Lee

(57) ABSTRACT

A universal hands-free receiver for a mobile telephone includes a base, an adjusting device slidably mounted on the upper portion of the base, an upper holder fixed on the adjusting device to move therewith and having an upper receiving space formed in the bottom thereof, and a lower holder fixed on the lower portion of the base and having a lower receiving space formed on the top thereof opposite to the upper receiving space. In such a manner, the adjusting device is able to move on the base so as to adjust the distance between the upper holder and the lower holder such that the distance between the upper holder and the lower holder is adjustable so as to suit the mobile telephones of different length.

15 Claims, 11 Drawing Sheets

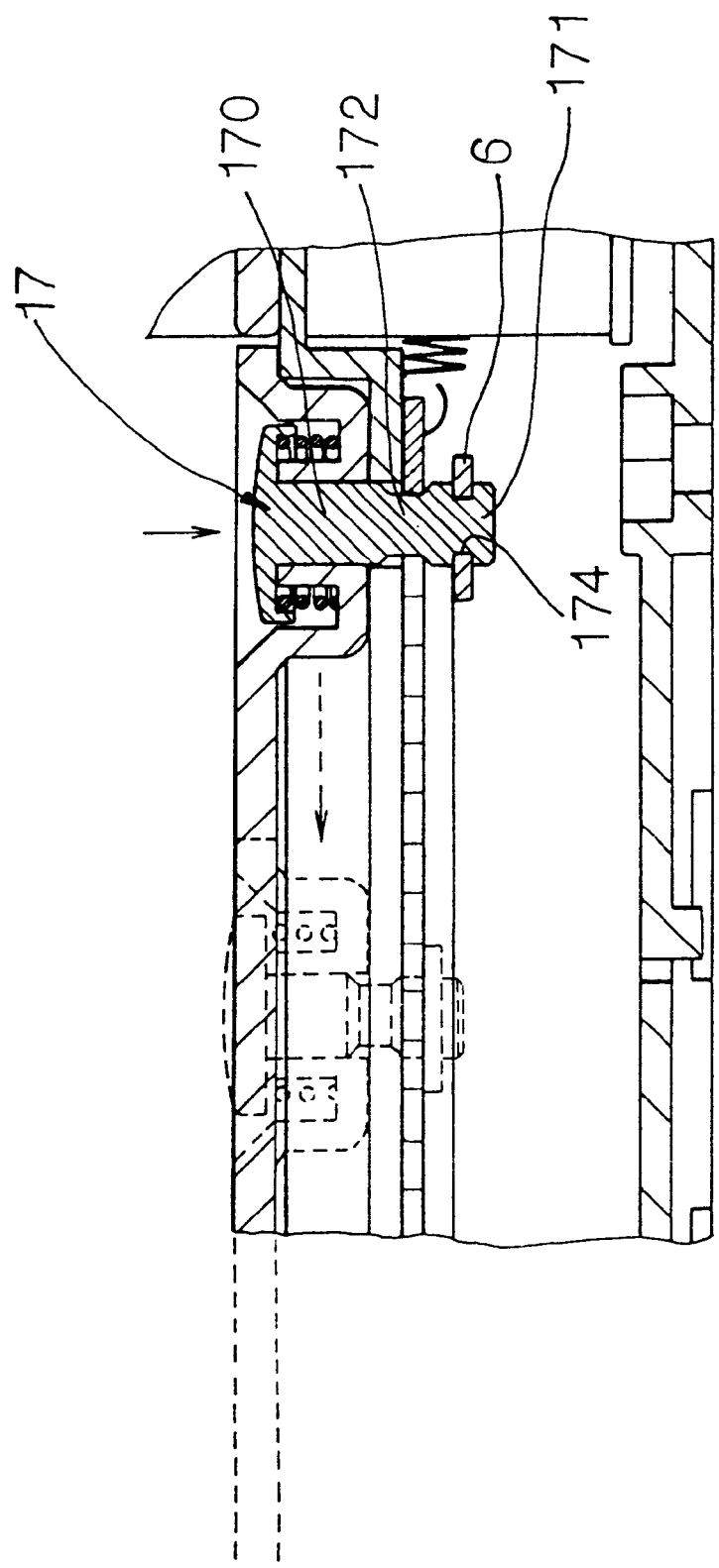
F I G. 11

UNIVERSAL HANDS-FREE RECEIVER FOR A MOBILE TELEPHONE

BACKGROUND OF THE INVENTION

1. Field of the Invention

The present invention relates to a universal type of hands-free receiver for a mobile telephone.

2. Description of the Related Prior Art

A conventional hands-free receiver is provided for holding and supporting a mobile telephone. However, the conventional hands-free receiver is used to suit the mobile telephones of the same type and the same size only such that it cannot mate the mobile telephone of different types and sizes, thereby easily limiting the versatility of the conventional hands-free receiver. The present invention has arisen to overcome the disadvantage of the conventional hands-free receiver.

SUMMARY OF THE INVENTION

The primary objective of the present invention is to provide a universal hands-free receiver for a mobile telephone comprising a base, an adjusting device slidably mounted on the upper portion of the base, an upper holder fixed on the adjusting device to move therewith and having an upper receiving space formed in the bottom thereof, and a lower holder fixed on the lower portion of the base and having a lower receiving space formed on the top thereof opposite to the upper receiving space. In such a manner, the adjusting device is able to move on the base so as to adjust the distance between the upper holder and the lower holder such that the distance between the upper holder and the lower holder is adjustable so as to suit the mobile telephones of different length.

Further objectives and advantages of the present invention will become apparent after a careful reading of the detailed description with reference to the accompanying drawings.

BRIEF DESCRIPTION OF THE DRAWINGS

FIG. 11 is a side cross-sectional view of the universal hands-free receiver as shown in FIG. 10.

DETAILED DESCRIPTION OF THE PREFERRED EMBODIMENTS

Figure 1:
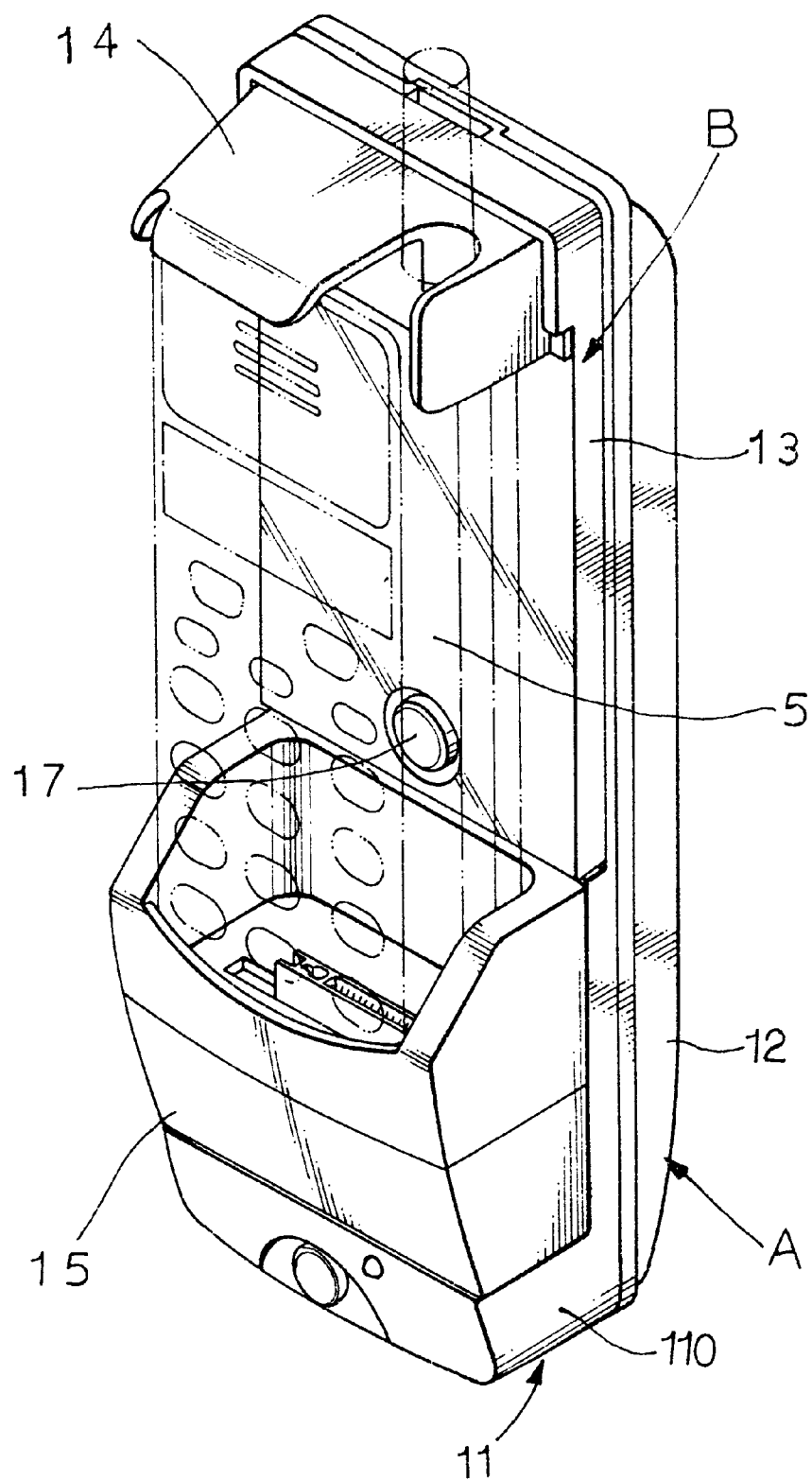
FIG. 1 is a perspective view of a universal hands-free receiver for a mobile telephone according to the present invention.
Figure 2:
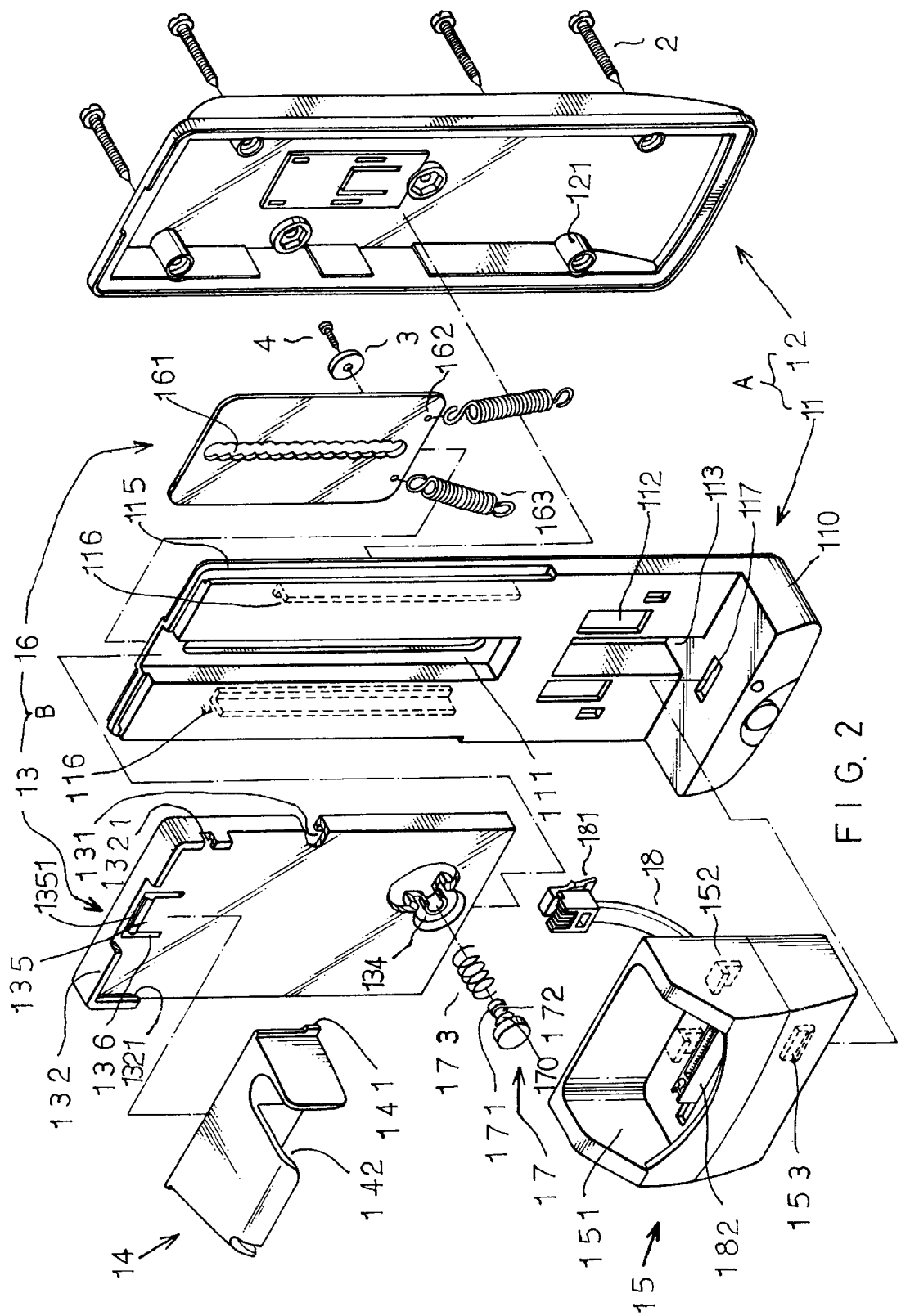
FIG. 2 is an exploded view of the universal hands-free receiver as shown in FIG. 1.
Figure 3:
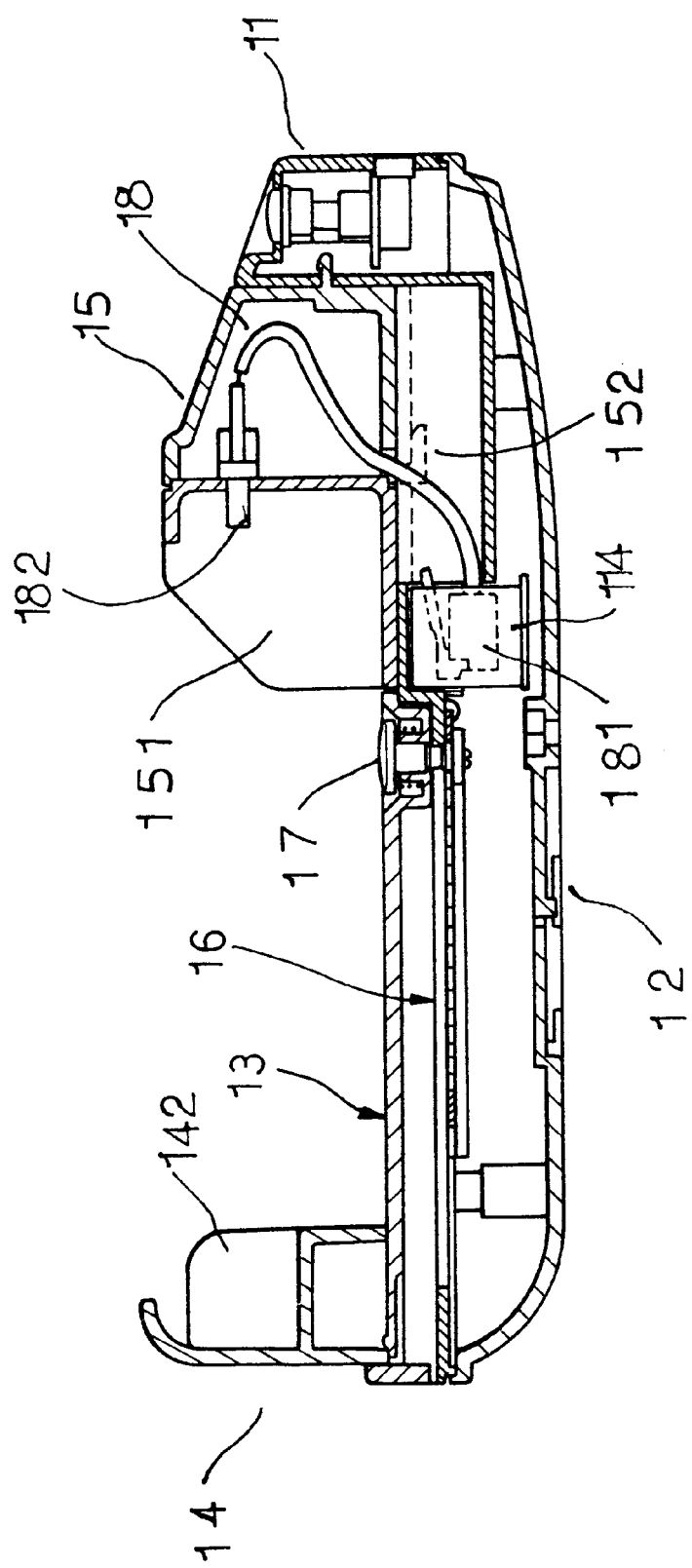
FIG. 3 is a side cross-sectional view of the universal hands-free receiver as shown in FIG. 1.

With reference to FIGS. 1–4, a universal hands-free receiver according to the present invention is provided for supporting a mobile telephone 5 and comprises a base A, an adjusting device B slidably mounted on the upper portion of the base A, an upper holder 14 fixed on the adjusting device B to move therewith and having an upper receiving space 142 formed in the bottom thereof, and a lower holder 15 fixed on the lower portion of the base A and having a lower receiving space 151 formed on the top thereof opposite to the upper receiving space 142. In such a manner, the adjusting device B is able to move on the base A so as to adjust the distance between the upper holder 14 and the lower holder 15 such that the distance between the upper holder 14 and the lower holder 15 is adjustable so as to suit the mobile telephones of different length.

The base A includes an elongate support rack 11 having a first side and a second side, and a casing 12 fixed on the second side of the support rack 11. The casing 12 includes a plurality threaded posts 121 formed on the inner wall thereof, and a plurality of screws 2 each extending through the respective threaded post 121, and each screwed into the support rack 11, thereby fixing the casing 12 to the support rack 11.

The adjust device B includes a slide 13 having a first side and a second side slidably mounted on the upper portion of the first side of the support rack 11, the upper holder 14 is fixed on the first side of the slide 13, and the lower holder 15 is fixed on the lower portion of the first side of the support rack 11.

The support rack 11 includes two elongate L-shaped first flanges 115 formed on the first side thereof each extending outward, and the slide 13 includes two elongate L-shaped second flanges 131 formed on the second side thereof each extending inward and each slidably abutting the respective first flange 115 such that the slide 13 is able to slide on the support rack 11.

The slide 13 includes a catch arm 132 formed on the top of the first side thereof and having two end portions each forming a slot 1321 extending downward, and the upper holder 14 is retained by the catch arm 132 and includes two end portions each forming an ear 141 received in the respective slot 1321. The slide 13 includes an inverted U-shaped slot 136 formed on the top of the first side thereof, thereby defining a flexible piece 135 abutting the wall of the upper holder 14, and a retaining lug 1351 extending outward from the flexible piece 135 to securely press the wall of the upper holder 14.

The slide 13 includes a stepwise chamber 134 formed in the lower portion thereof, the support rack 11 has an elongate slot 111 longitudinally defined therein, and the adjusting device B includes a positioning plate 16 having a first side slidably mounted on the second side of the support rack 11 and a second side, a plurality of circular positioning holes 161 defined in the positioning plate 16 and communicating with each other, a positioning press button 17 including a first portion formed with a cylindrical shank 170 slidably extending through the chamber 134 and the elongate slot 111, a mediate portion formed with a stub 172 having a diameter smaller than that of each of the positioning holes 161, and a second portion formed with a head 171 having a diameter equal to that of each of the positioning holes 161, a spring 173 mounted in the chamber 134 and pressing the positioning press button 17, and a fastening member abutting the second side of the positioning plate 16 and secured to the head 171 of the positioning press button 17.

The fastening member includes a washer 3 abutting the second side of the positioning plate 16, and a screw 4 extending through the washer 3 and screwed into the head 171 of the positioning press button 17. The support rack 11 includes two elongate L-shaped ribs 116 formed on the second side thereof each extending inward, and the positioning plate 16 is slidably retained between the two ribs 116.

The adjusting device B includes two springs 163 each having a first end attached to the lower portion of the positioning plate 16, and a second end attached to the respective threaded post 121 located on the lower portion of the casing 12. The positioning plate 16 includes two holes 162 defined in the lower portion thereof, and the first end of each of the two springs 163 is attached to the respective hole 162.

The support rack 11 includes an extension 110 extending from the bottom thereof and defining a positioning opening 117, and the lower holder 15 is supported on the top of the extension 110, and includes a hook 153 extending downward from the bottom thereof and received in the positioning opening 117. The support rack 11 includes two locking cavities 112 formed on the lower portion of the first side thereof, and the lower holder 15 includes two inverted L-shaped hooks 152 extending from the side wall thereof each received in the respective locking cavity 112.

The support rack 11 includes an opening 113 formed on the lower portion of the first side thereof, and a telecommunication receptacle 114 (see FIG. 3) received in the opening 113. The universal hands-free receiver further comprises a signal exchange connecting wire 18 having a first side extending through the bottom of the lower holder 15 and provided with a receptacle 182 received in the lower receiving space 151 to co-operate with the mobile telephone 5 mounted between the upper holder 14 and the lower holder 15, and a second side extending through the opening 113 and provided with a telecommunication plug 181 (see FIG. 3) fitted into the telecommunication receptacle 114. In practice, the signal exchange connecting wire 18 has a level matching that of the mobile telephone 5 mounted between the upper holder 14 and the lower holder 15.

Figure 4:
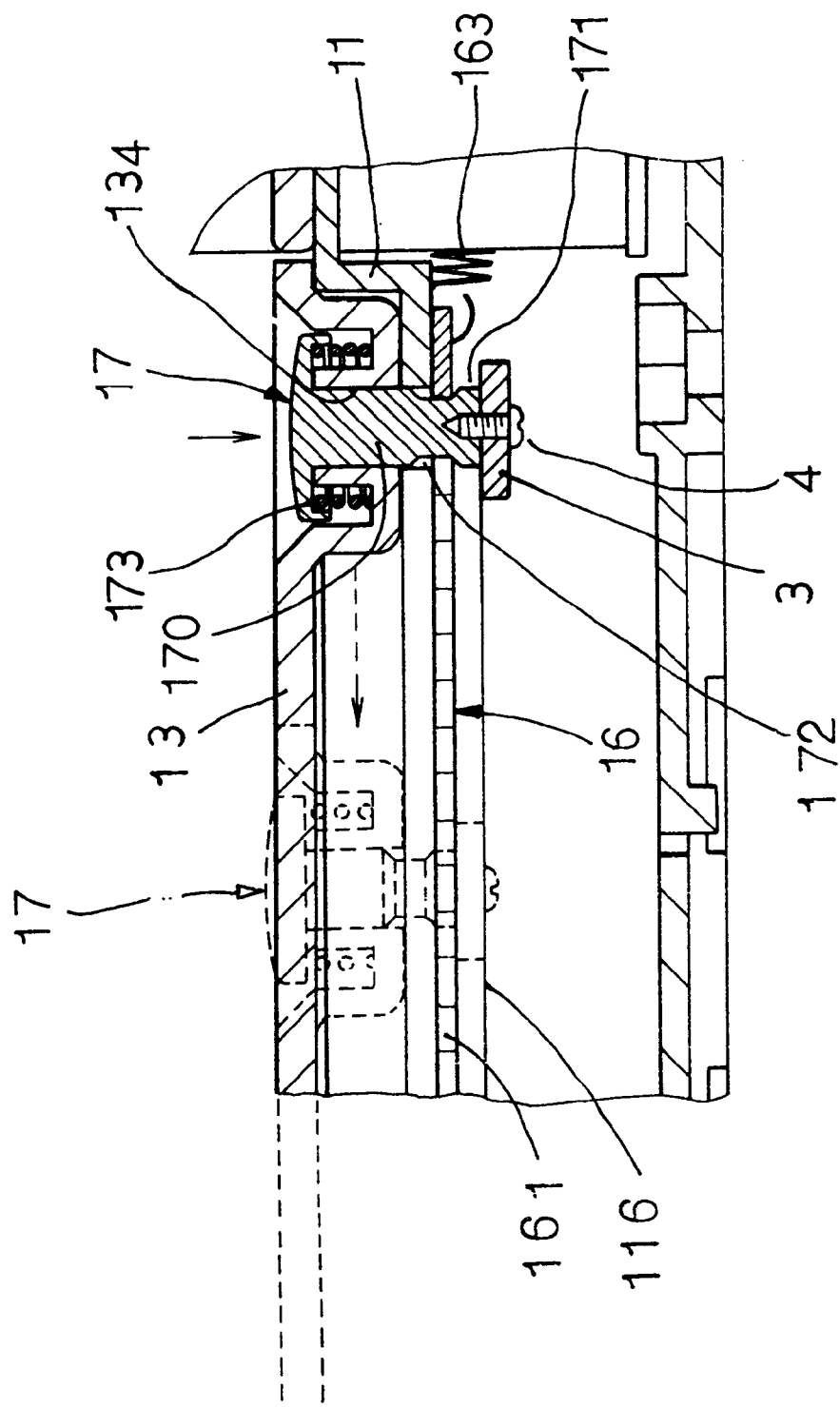
FIG. 4 is an enlarged view of the universal hands-free receiver as shown in FIG. 3.
Figure 5:
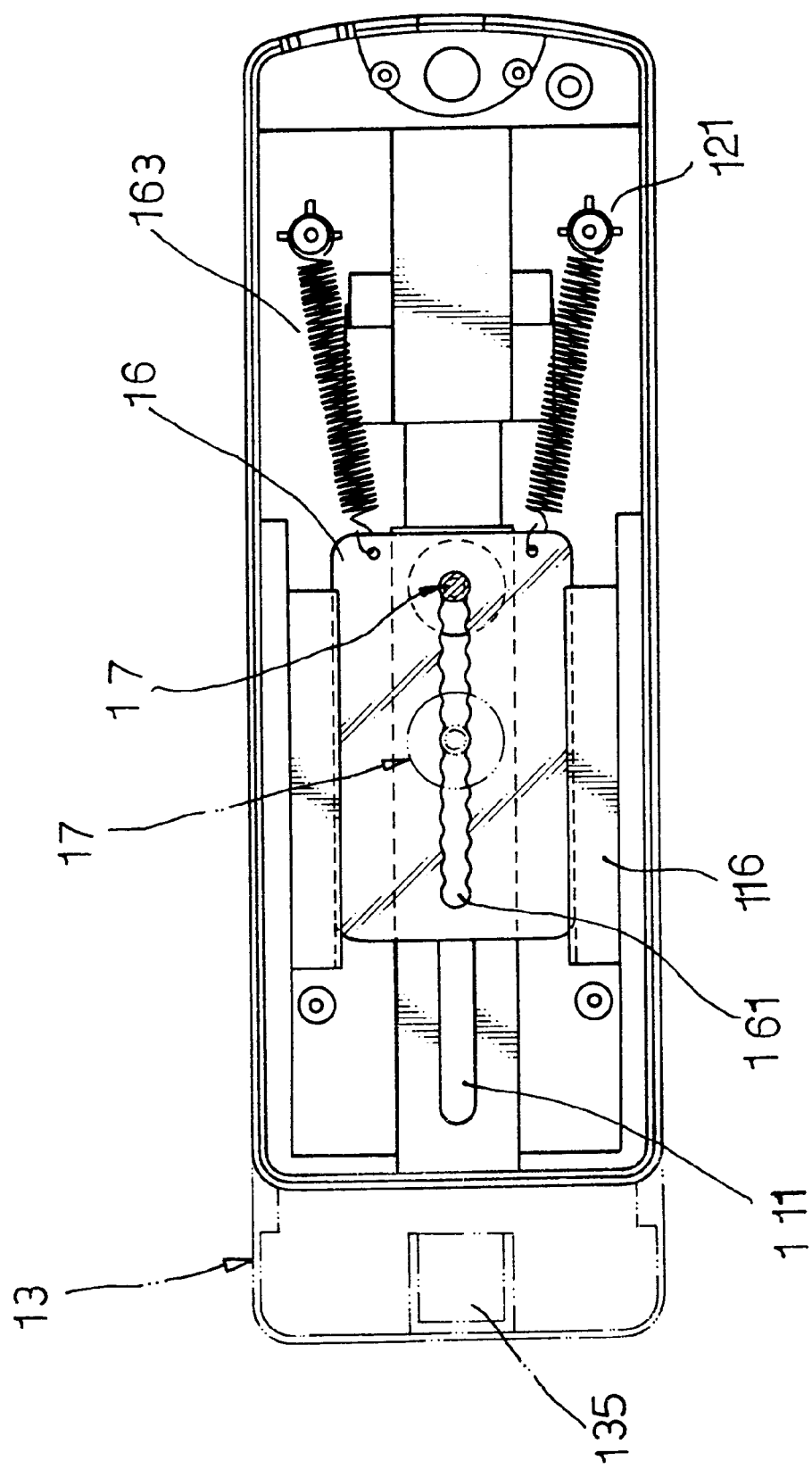
FIG. 5 is a bottom view of the universal hands-free receiver as shown in FIG. 3.
Figure 6:
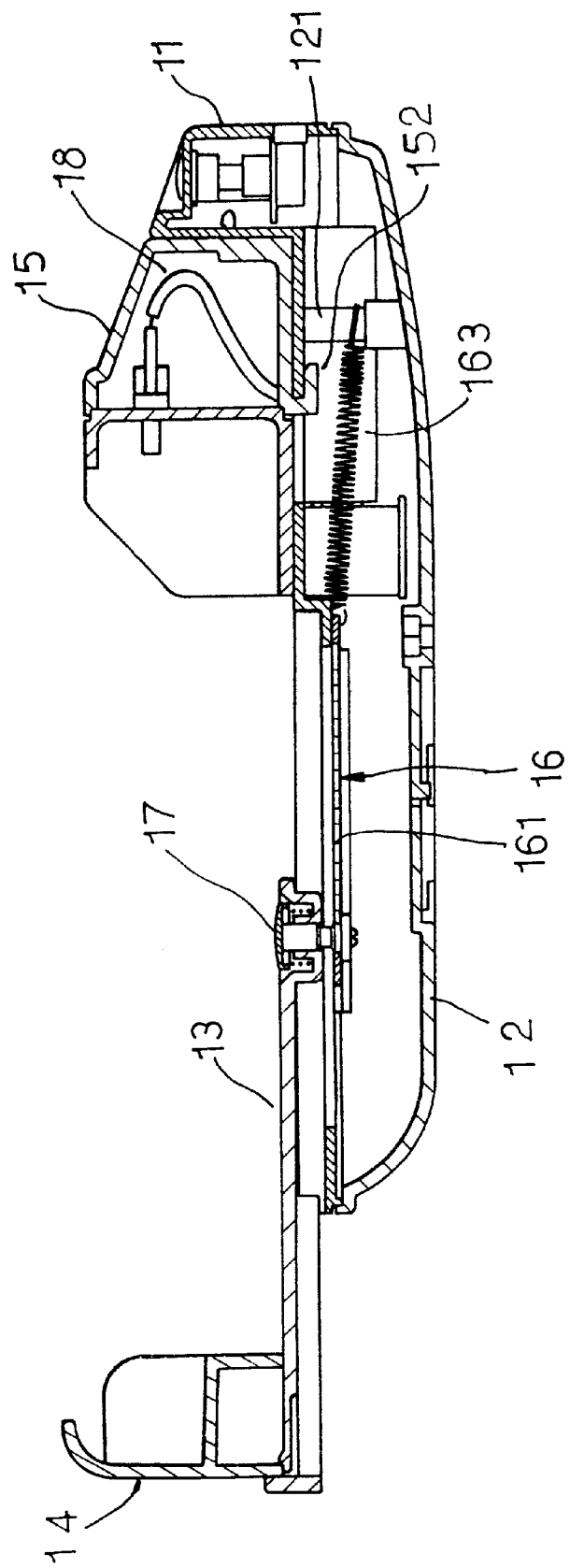
FIGS. 6 and 7 are operational views of the universal hands-free receiver as shown in FIG. 3.
Figure 7:
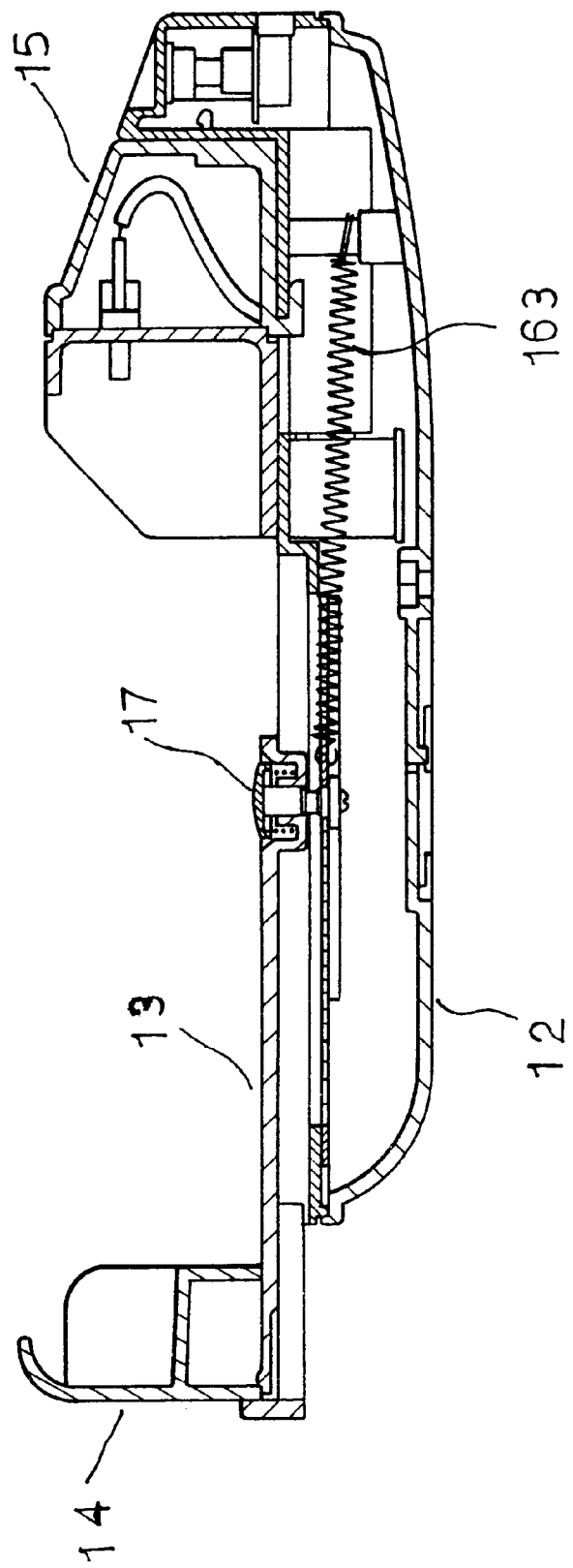

Now, with reference to FIGS. 1–7, the press button 17 can be pressed toward the support rack 11 to the position as shown in FIG. 4, thereby inserting the stub 172 into the positioning holes 161 such that the slide 13 together with the press button 17 can be moved upward along the guide slot 111 by means of the stub 172 sliding in the positioning holes 161, and can be moved to the position as shown in phantom lines in FIGS. 4 and 5, thereby allowing the mobile telephone 5 to be received into the space defined between the upper holder 14 and the lower holder 15. Then, the press button 17 can be returned to its original position when the external force is removed by means of the spring 173, thereby inserting the large head 171 into the positioning holes 161 such that the large head 171 is locked in one of the positioning holes 171, thereby securing the press button 17 to the positioning plate 16. The slide 13 and the upper holder 14 can then be pressed to slightly move upward, thereby forcing the positioning plate 16 to move upward via the press button 17 such that the mobile telephone 5 can be entirely received into the space defined between the upper holder 14 and the lower holder 15. The positioning plate 16 can then returned to its original position by means of the springs 163 when the external force is removed such that the slide 13 together with the upper holder 14 can be moved downward via the press button 17 to clamp the mobile telephone 5 by the upper holder 14, thereby preventing the mobile telephone 5 from detaching from the hands-free receiver.

Figure 8:
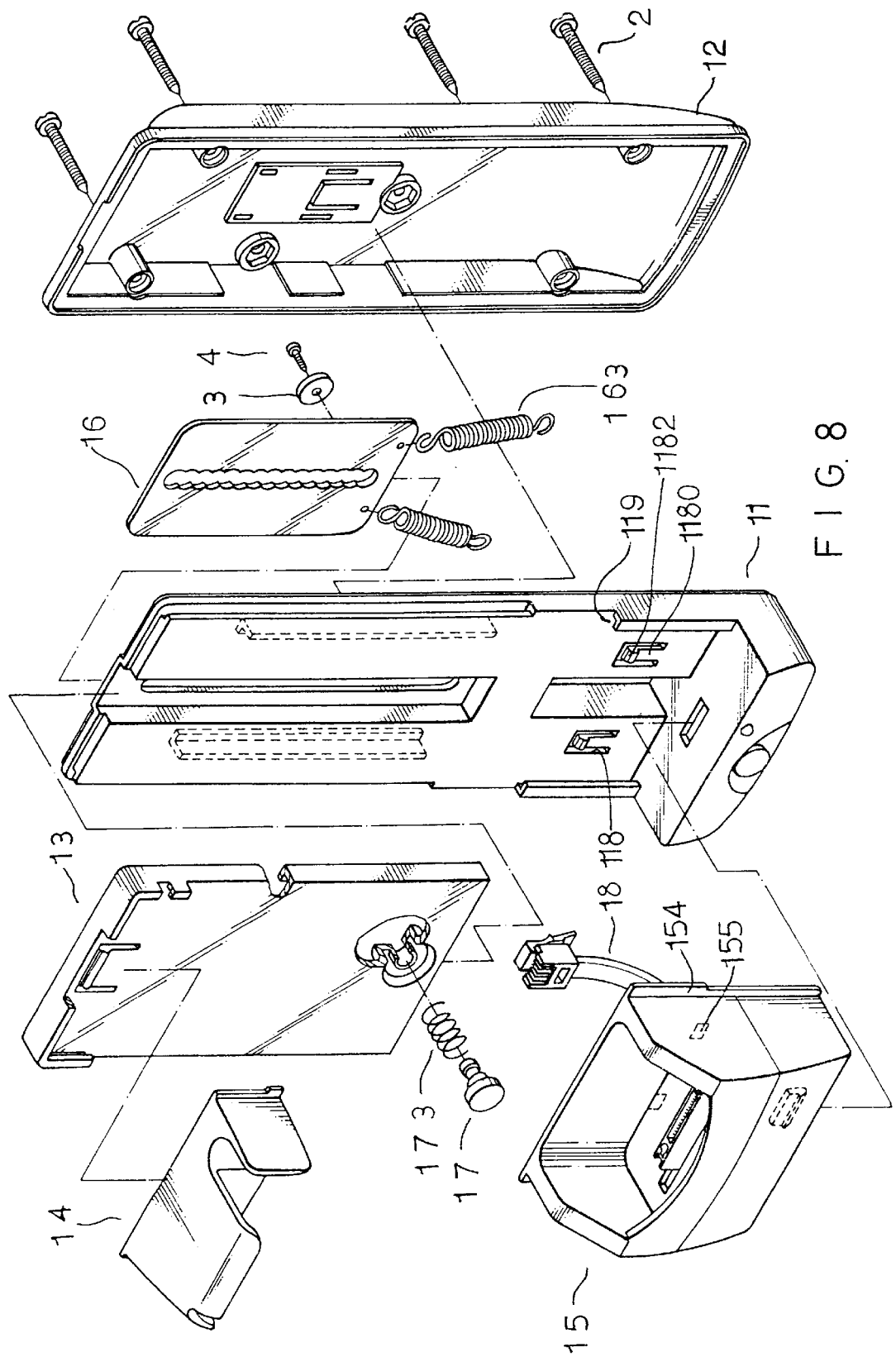
FIG. 8 is an exploded view of a universal hands-free receiver for a mobile telephone according to another embodiment of the present invention.
Figure 9:
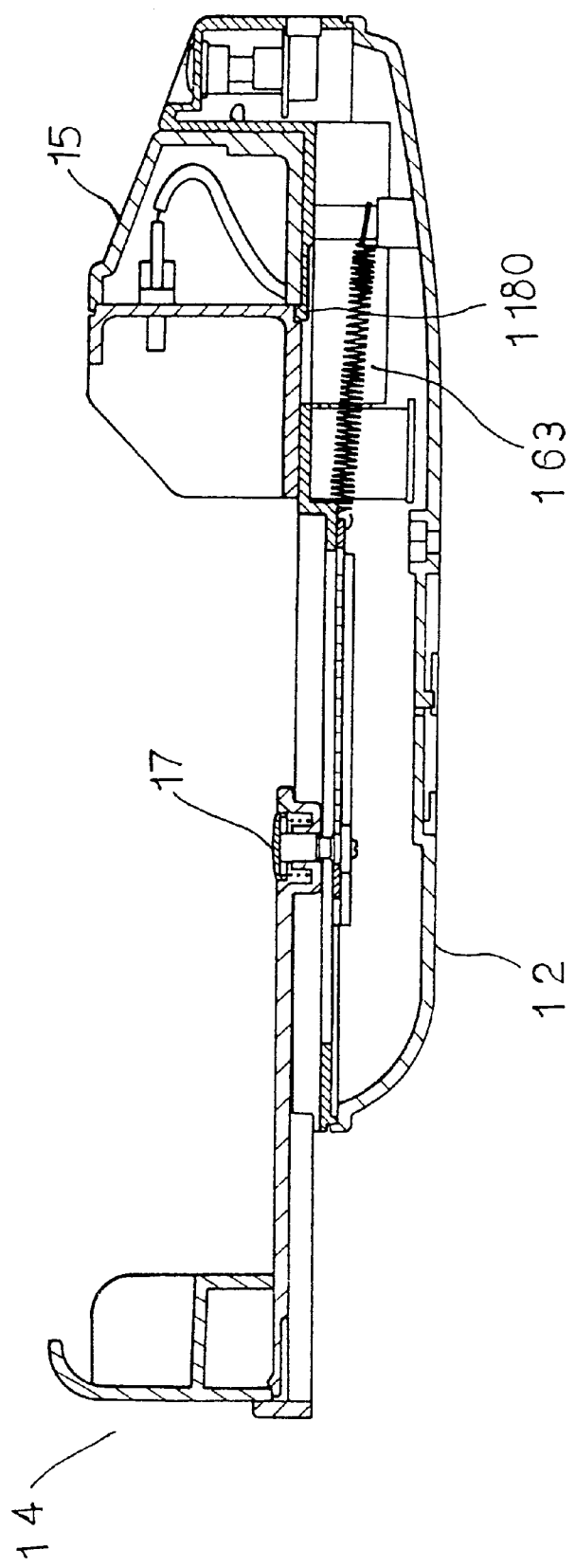
FIG. 9 is a side cross-sectional view of the universal hands-free receiver as shown in FIG. 8.

Now, with reference to FIGS. 8 and 9, according to another embodiment of the present invention, the support rack 11 includes two L-shaped flanges 119 formed on the lower portion of the first side thereof, and the lower holder 15 includes two flaps 154 each laterally extending from the side wall thereof and each received in the respective flange 119. The lower holder 15 includes two cavities 155 each defined in the side wall thereof, and the support rack 11 includes two inverted U-shaped slots 118 formed in the lower portion of the first side thereof, thereby each defining a flexible piece 1180 formed with a locking hook 1182 locked in the respective cavity 155.

Figure 10:
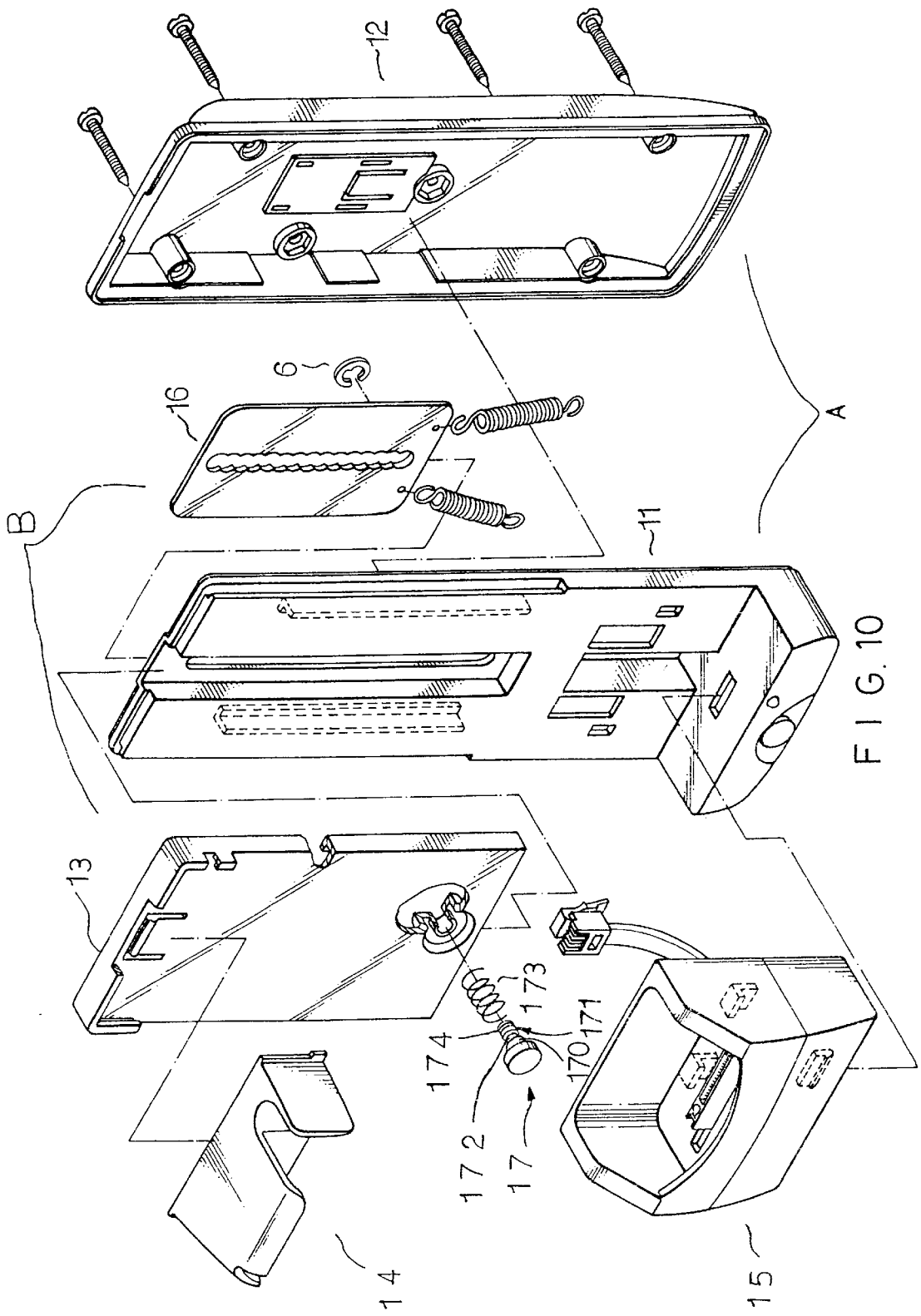
FIG. 10 is an exploded view of a universal hands-free receiver for a mobile telephone according to a further embodiment of the present invention.

Now, with reference to FIGS. 10 and 11, according to a further embodiment of the present invention, the head 171 of the positioning press button 17 includes an annular groove 174 defined in the wall thereof, and the fastening member includes a C-shaped snapper 6 abutting the second side of the positioning plate 16, and secured to the annular groove 174 of the head 171 of the positioning press button 17.

Accordingly, according to the present invention, the upper holder 14, the lower holder 15, and the signal exchange connecting wire 18 are adapted to suit the mobile telephones 5 of different types such that the hands-free receiver can function as a universal hands-free receiver.

Although the present invention has been described with a certain degree of particularity, it is to be understood that the present disclose has been made by way of example only and that many other possible modifications and variations can be made without departing from the scope and spirit of the present invention.

I claim:

1. A universal hands-free receiver for a mobile telephone comprising:

a base including an elongate support rack having a first side and a second side, the support rack including at least two elongate L-shaped first flanges formed on the first side thereof each extending outward;

an adjusting device slidably mounted on an upper portion of the base, the adjusting device including a slide having a first side and a second side slidably mounted to the first side of the support rack, the slide including at least two elongate L-shaped second flanges formed on the second side thereof each extending inward, each second flange slidably engaging a respective one of the first flanges;

an upper holder fixed on the adjusting device to move therewith and having an upper receiving space formed at a bottom thereof, the upper holder being fixed to the first side of the slide; and a lower holder fixed on a lower portion of the base and having a lower receiving space formed at a top thereof to oppose the upper receiving space, the lower holder being fixed to the first side of the support rack;

wherein, the adjusting device is slidable on the base so as to adjust the distance between the upper holder and the lower holder and thereby adaptively receive mobile telephones of various lengths.

2. The universal hands-free receiver as claimed in claim 1, wherein the base includes a casing fixed on the second side of the support rack.

3. The universal hands-free receiver as claimed in claim 1, wherein the slide includes an inverted U-shaped slot formed at a top of the first side thereof, thereby defining a flexible piece abutting the wall of the upper holder, and a retaining lug extending outward from the flexible piece to securely press the wall of the upper holder.

4. The universal hands-free receiver as claimed in claim 1, wherein the support rack includes an opening formed at a lower portion of the first side thereof, and a telecommunication receptacle received in the opening, and the universal hands-free receiver further comprises a signal exchange connecting wire having a first side extending through a bottom of the lower holder and provided with a receptacle received in the lower receiving space to co-operate with a mobile telephone which is mounted between the upper holder and the lower holder, and a second side extending through the opening and provided with a telecommunication plug fitted into the telecommunication receptacle.

5. The universal hands-free receiver as claimed in claim 4, wherein the signal exchange connecting wire has a level matching that of the mobile telephone mounted between the upper holder and the lower holder.

6. A universal hands-free receiver for a mobile telephone comprising:

a base including an elongate support rack having a first side and a second side;

an adjusting device slidably mounted on an upper portion of the base, the adjusting device including a slide having a first side and a second side slidably mounted to the first side of the support rack, the slide including a catch arm formed at a top of the first side thereof and having two end portions each forming a slot extending downward;

an upper holder fixed on the adjusting device to move therewith and having an upper receiving space formed at a bottom thereof, the upper holder being fixed to the first side of the slide, the upper holder being retained by the catch arm and including two end portions each forming an ear received in a respective one of the slots; and a lower holder fixed on a lower portion of the base and having a lower receiving space formed at a top thereof to oppose the upper receiving space, the lower holder being fixed to the first side of the support rack;

wherein, the adjusting device is slidable on the base so as to adjust the distance between the upper holder and the lower holder and thereby adaptively receive mobile telephones of various lengths.

7. A universal hands-free receiver for a mobile telephone comprising:

a base including an elongate support rack having a first side and a second side;

an adjusting device slidably mounted on an upper portion of the base, the adjusting device including a slide having a first side and a second side slidably mounted to the first side of the support rack;

an upper holder fixed on the adjusting device to move therewith and having an upper receiving space formed at a bottom thereof, the upper holder being fixed to the first side of the slide; and a lower holder fixed on a lower portion of the base and having a lower receiving space formed at a top thereof to oppose the upper receiving space, the lower holder being fixed to the first side of the support rack;

the slide having a stepwise chamber formed at a lower portion thereof, the support rack having an elongate slot longitudinally defined therein, and the adjusting device including;

a positioning plate having a first side slidably mounted on the second side of the support rack and having a second side, a plurality of circular positioning holes being defined in the positioning plate and communicating with each other, a positioning press button including a first portion formed with a cylindrical shank slidably extending through the stepwise chamber and the elongate slot, a mediate portion formed with a stub having a diameter smaller than that of each of the positioning holes, and a second portion formed with a head having a diameter equal to that of each of the positioning holes, a spring mounted in the chamber and pressing the positioning press button, and a fastening member abutting the second side of the positioning plate and secured to the head of the positioning press buttons;

wherein, the adjusting device is slidable on the base so as to adjust the distance between the upper holder and the lower holder and thereby adaptively receive mobile telephones of various lengths.

8. The universal hands-free receiver as claimed in claim 7, wherein the fastening member includes a washer abutting the second side of the positioning plate, and a screw extending through the washer and screwed into the head of the positioning press button.

9. The universal hands-free receiver as claimed in claim 7, wherein the head of the positioning press button has an annular groove defined in the wall thereof, and the fastening member includes a C-shaped snapper abutting the second side of the positioning plate, and secured to the annular groove of the head of the positioning press button.

10. The universal hands-free receiver as claimed in claim 7, wherein the support rack includes two elongate L-shaped ribs formed on the second side thereof each extending inward, and the positioning plate is slidably retained between the two ribs.

11. The universal hands-free receiver as claimed in claim 7, wherein the adjusting device includes two springs each having a first end attached to the lower portion of the positioning plate, and a second end attached to the lower portion of the base.

12. The universal hands-free receiver as claimed in claim 1, wherein the support rack includes an extension extending from the bottom thereof and defining a positioning opening, and the lower holder is supported on the extension, the lower holder including a hook extending downward from a bottom thereof and engaging in the positioning opening.

13. The universal hands-free receiver as claimed in claim 12, wherein the support rack includes two locking cavities formed on a lower portion of the first side thereof, and the lower holder includes two inverted L-shaped hooks extending from a side wall thereof each received in the respective locking cavity.

14. The universal hands-free receiver as claimed in claim 12, wherein the support rack includes two L-shaped flanges formed on a lower portion of the first side thereof, and the lower holder includes two flaps each laterally extending from a side wall thereof and each received in the respective flange.

15. The universal hands-free receiver as claimed in claim 14, wherein the lower holder includes two cavities each defined in the side wall thereof, and the support rack includes two inverted U-shaped slots formed in the lower portion of the first side thereof, thereby each defining a flexible piece formed with a locking hook locked in the respective cavity.

* * * * *